US006410112B1

(12) United States Patent
Hatfield

(10) Patent No.: US 6,410,112 B1
(45) Date of Patent: Jun. 25, 2002

(54) MULTI-PART PRESSURE SENSITIVE LABEL AND METHOD FOR MANUFACTURE

(75) Inventor: Ray Hatfield, Waynesville, OH (US)

(73) Assignee: Intermec IP Corporation

( * ) Notice: Subject to any disclaimer, the term of this patent is extended or adjusted under 35 U.S.C. 154(b) by 101 days.

(21) Appl. No.: 09/591,295

(22) Filed: Jun. 9, 2000

(51) Int. Cl.[7] ............................ B42D 15/00; B32B 7/12

(52) U.S. Cl. .................... 428/40.1; 428/41.7; 428/41.8; 428/41.9; 428/42.2; 283/74; 283/80; 283/81

(58) Field of Search .............................. 428/40.1, 41.7, 428/41.8, 41.9, 42.2, 43, 906; 283/74, 80, 81

(56) References Cited

U.S. PATENT DOCUMENTS

| | | | | | |
|---|---|---|---|---|---|
| 4,457,539 | A | * | 7/1984 | Hamisch, Jr. ................ | 283/81 |
| 4,927,179 | A | * | 5/1990 | Ehret et al. .................... | 283/79 |
| 5,343,647 | A | * | 9/1994 | Bulka .......................... | 40/630 |
| 5,673,943 | A | * | 10/1997 | Campbell .................... | 283/79 |
| 5,833,273 | A | * | 11/1998 | Strenk et al. ................. | 283/67 |
| 6,096,397 | A | * | 8/2000 | Murphy ..................... | 428/40.1 |

* cited by examiner

*Primary Examiner*—Daniel Zirker

(57) ABSTRACT

A multi-layer label/tag is disclosed, which may be utilized either as a label or a tag, depending on the needs of the user. The label/tag includes a printed or printable top face sheet and a number of release layers. The top face sheet is attached to the release layers such that it may be removed as a tag or as a label. Cutting through the multi-layer assembly allows a user to remove the item as a label or a tag, as needed.

7 Claims, 2 Drawing Sheets

Fig. 2
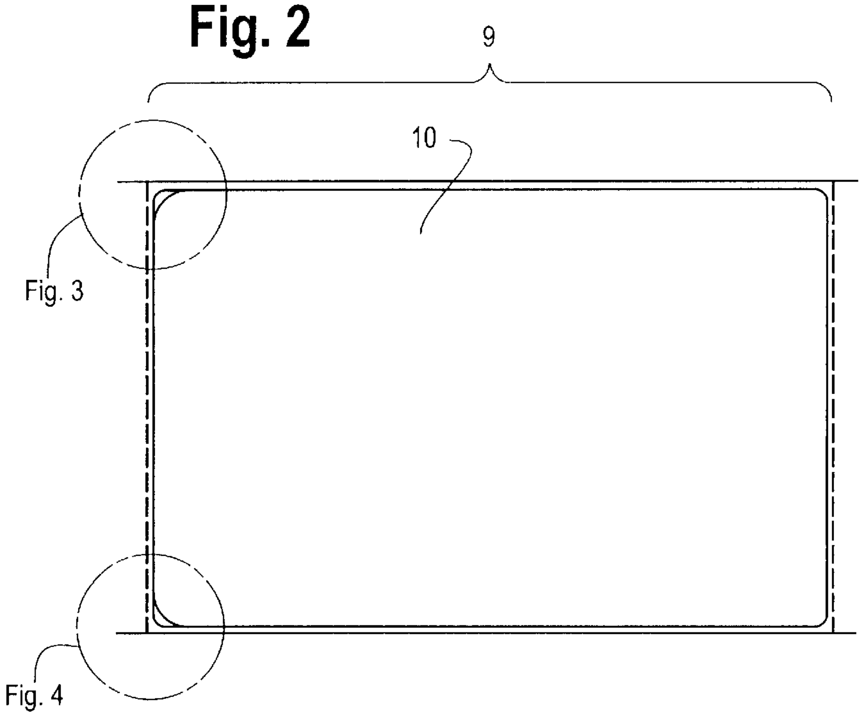
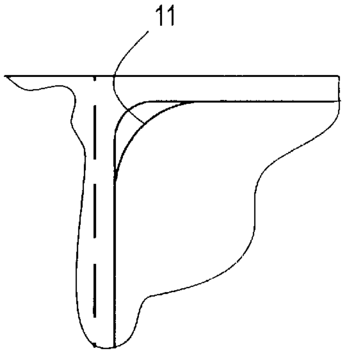
Fig. 3
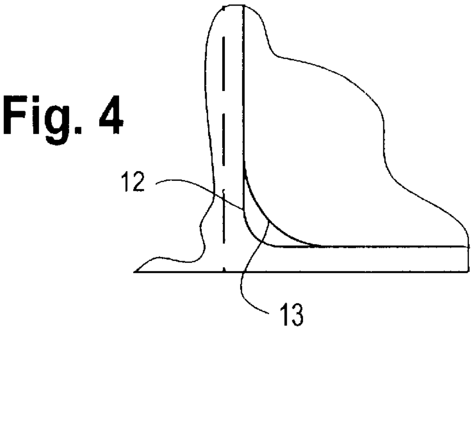
Fig. 4

MULTI-PART PRESSURE SENSITIVE LABEL AND METHOD FOR MANUFACTURE

BACKGROUND OF THE INVENTION

1. Field of the Invention

The present invention is directed to the field of printed or printable tags and/or labels. More specifically, the present invention is directed to a printed or printable item which may be utilized as a tag or a label, depending on the needs of the user.

2. Description of the Related Art

In the past, pre-printed or printable tags and pre-printed or printable labels were separate items. For each case, the tags or the labels were produced by laminating a printable face sheet with the appropriate adhesive sandwiched between the face sheet and a release liner. In the case of a tag, the appropriated adhesive would be a dry gum or similar type, which would cure such that it would have no tack when de-laminated from the liner. In the case of a label, the appropriate adhesive would be a pressure sensitive type, which maintains the ability to adhere to another surface after being de-laminated from the liner. The prior art was directed to the providing of discrete items which were separately either tags or labels. The prior art items did not provide the ability to be used as either a tag or a label, or the ability to be used first as a label and then later be used as a tag or a label. These problems are solved by the present invention.

SUMMARY OF THE INVENTION

The present invention relates to a pre-printed or printable item which may be utilized either as a tag or a label, depending on the needs of the user. The item may be formed as a laminated multi-layered sheet, or fan folded, and may be wound into a roll configuration to be unwound during use. The item in one embodiment includes alternating layers, including a printed or printable face sheet, a dry gum type adhesive, a release liner, a pressure sensitive adhesive layer, another release liner, another pressure sensitive adhesive layer, and a final release layer. The item includes precise cuts through the various layers of the laminated materials to expose to the user edges of the item which allow the item to be removed according to required use. In one embodiment, separate cuts are preformed such that the face sheet may be removed with only the dry gum adhesive on an opposite side, allowing the item to be used as a tag because the dry gum adhesive loses its adhesive properties after being removed from the release layer. Alternately, the face sheet may be removed together with the release liner, such that a pressure sensitive adhesive is exposed on the opposite side of the face sheet, allowing the item to be used as a label because the pressure sensitive adhesive maintains its adhesive properties after being removed from the underlying release liner. Also, the face sheet may be removed with two layers of release liner, such that the item may be applied as a label and then removed and re-applied as a label or may at any time be used as a tag. The various cuts into the laminated multi-layered web allow a user to choose the mode of use for the item.

It is an object of the present invention to provide an item which may be used as either a label or a tag.

It is a further object to provide an item which may be first used as a label, and may be removed and re-applied as a label, or may at any time be used as a tag.

It is a further object to provide an item which has discrete edges presented to a user which allows the user to choose whether the item is to be utilized as a label or a tag.

These and other objects are realized by the present invention.

BRIEF DESCRIPTION OF THE DRAWINGS

FIG. 2 is a plan view of an individual label/tag.

FIG. 3 is a detailed plan view of the invention.

FIG. 4 is a detailed plan view of the invention.

FIG. 1 illustrates one embodiment of the invention. A face sheet (1) is bonded with a dry gum adhesive (2) to a first release liner (3). The first release liner (3) is itself bonded on an opposite side with a first pressure-sensitive adhesive (4) to a second release liner (5). The second release liner (5) may be bonded on an opposite side with a second pressure sensitive adhesive (6) to a third release liner (7). The number of face sheets, release liners, and adhesives are specified as above in this embodiment, but may include other variations such as further layers of release liners and adhesives.

Figure 1:
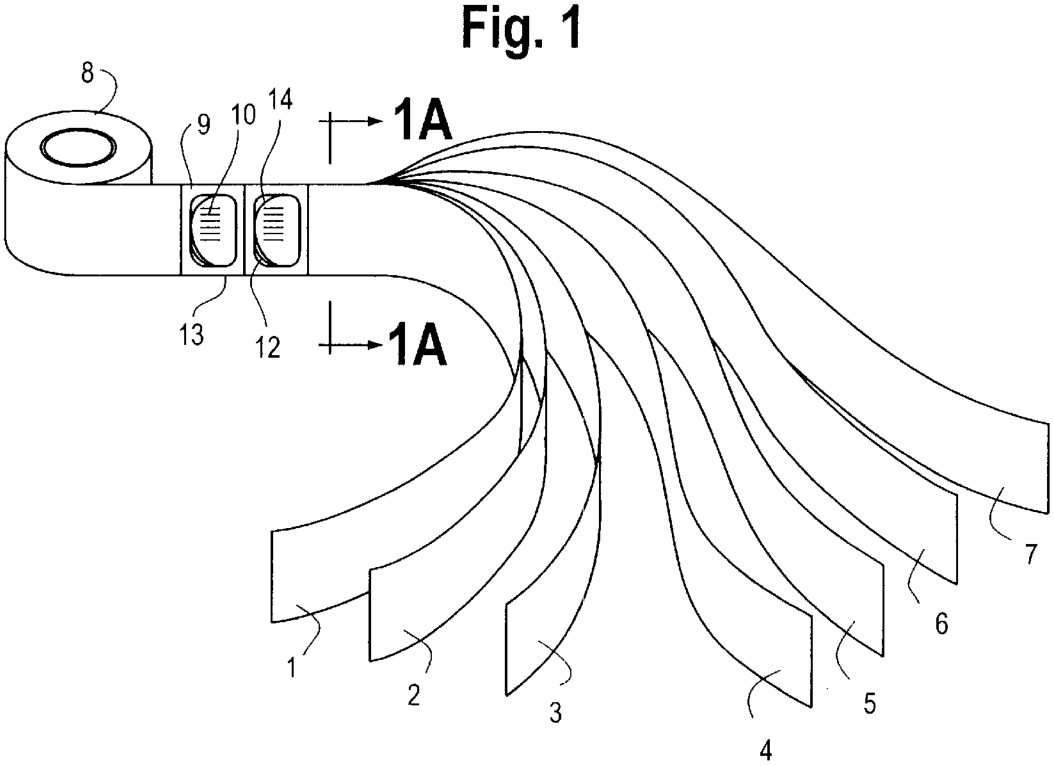
FIG. 1 is an exploded perspective view of the invention.
Figure 1A:
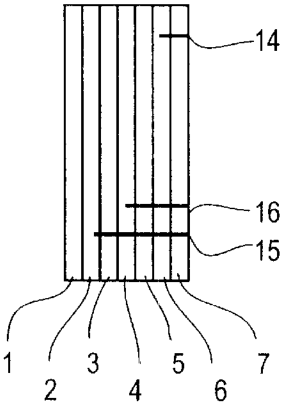
FIG. 1A is a sectional view of the layers of the invention showing schematically various cuts into the layers.

The various layers of the invention may be laminated into a continuous web or strip (17), and may be wound onto a label/tag roll (8) as illustrated.

Individual labels/tags (9) may be formed along the strip (17) as shown. Consecutive pre-printed or printable label/tag faces (10) may be presented.

The label/tag face (10) may accommodate printed matter such as human readable text, graphics, and/or bar or other types of codes. An RFID tag may also be a part of the label/tag (9).

The first, second, and third release liners (3,5 and 7) may be of the silicon type. The individual labels/tags (9) may be die-cut from the laminated web (17).

As shown in FIG. AA, the continuous web (17) may be die-cut to various depths to create the individual labels/tags (9). In one embodiment the individual label/tag (9) is cut to a depth to create a tag cut (14), to a second depth to create a first label cut (15), and to a third depth to create a second label cut (16).

Referring back to figure one, tag cut (14) creates a tag edge (11), first label cut (15) creates a first label edge (12), and second label cut (16) creates a second label edge (13).

Referring now to FIG. 2, the individual label/tag (9) is shown, with the label/tag face (10).

FIGS. 3 and 4 are details of FIG. 2, which illustrate how in one embodiment the edges are presented after being die-cut from the continuous web (17).

Referring now to FIG. 3, the tag edge (11) is shown. A user may remove the item at this edge, which creates a tag, because the item is removed such that a dry gum adhesive is exposed on the bottom side of the face sheet, which adhesive has no self-adhesive properties to allow the re-attachment to another surface.

Referring to FIG. 4, if the label/tag (9) is removed at a first label edge (12), a label is created. The label may be attached to another surface by virtue of the pressure-sensitive adhesive on a bottom side of the label. Thereafter, if after attachment of the label to a surface, it becomes desirable to reuse the item again as a label, the user need only remove the label at the second label edge (13), and reattach it to another surface. The item may at any time be utilized as a tag simply by removing the tag at tag edge (11) shown in FIG. 3.

The above-mentioned example discloses one embodiment of the invention. Further embodiments include but are not limited to increased layers of the continuous web (17), which would allow a greater number of die-cuts resulting in an item having the capability of being reused as a label or a tag multiple times.

The foregoing examples are not intended to be restrictive of the disclosure of the invention, the scope of which is limited by the following claims.

What is claimed is:

1. A multi-layer label/tag assembly comprising:

a top face sheet, a first release liner, a dry gum type adhesive bonding the top face sheet with the first release liner, and a second release liner bonded to the first release liner by a pressure-sensitive adhesive, wherein the top face sheet is removable from the first release liner for use as a tag, and is removable from the second release liner for use as a label.

2. A multi-layer label/tag assembly, further comprising:

a tag edge disposed on the label/tag, and a first label edge disposed on the label/tag, wherein the top face sheet may be removed from the first release liner by gripping the tag edge, and may be removed from the second release liner by gripping the first label edge.

3. A multi-layer label/tag assembly according to claim 2, wherein the top face sheet has no means for self-adhesion when removed from the first release layer by gripping the tag edge, and has means for self-adhesion when removed from the second release liner by gripping the first label edge.

4. A multi-layer label/tag assembly according to claim 3, further comprising; a third release liner bonded to the second release liner by pressure-sensitive adhesive, and a second label edge, wherein the top face sheet, the first release liner, and the second release liner may be removed intact from the third release liner by gripping the second label edge.

5. A multi-layer label/tag assembly according to claim 4, wherein the top face sheet has no means for self-adhesion when removed from the first release liner when gripped by the tag edge, and has means for self-adhesion when removed by gripping the second label edge.

6. A multi-layer label/tag assembly according to claim 5, wherein the top face sheet, the first release liner, and the second release liner are removable intact, and are arranged and constructed such that they may be affixed together to a surface as a label, the first release liner and the top face sheet thereafter being removable for use as a label, the top face sheet being removable for use as a tag.

7. A method for forming a multi-layer label/tag assembly, comprising the steps of:

bonding a top face sheet to a first release liner by providing a dry gum type adhesive between them, bonding the first release liner to a second release liner by providing a pressure-sensitive adhesive between them, bonding the second release liner to a third release liner by providing a pressure-sensitive adhesive between them, cutting through the top face sheet to the dry gum adhesive at a first location to form a tag edge, cutting through the top face sheet and the first release liner to the first pressure sensitive adhesive at a second location to form a first label edge, and cutting through the top face sheet, the first release liner, and the second release liner to the second pressure-sensitive adhesive to form a second label edge, wherein the top face sheet may be removed by gripping the tag edge for use as a tag, a top face sheet and the first release liner may be removed together for use as a liner, and the top face sheet, the first release liner, and the second release liner may be removed together for use first as a label, and thereafter as a label or a tag.

* * * * *